(12) United States Patent
Eberlein et al.

(10) Patent No.: US 10,268,472 B2
(45) Date of Patent: Apr. 23, 2019

(54) UPGRADING SYSTEMS WITH REPLICATED DATA

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/596,287

(22) Filed: May 16, 2017

(65) Prior Publication Data

US 2018/0336022 A1    Nov. 22, 2018

(51) Int. Cl.
  *G06F 8/65*    (2018.01)
  *G06F 8/71*    (2018.01)
  *G06F 17/30*   (2006.01)

(52) U.S. Cl.
  CPC .............. *G06F 8/65* (2013.01); *G06F 8/71* (2013.01); *G06F 17/30339* (2013.01); *G06F 17/30575* (2013.01)

(58) Field of Classification Search
  None
  See application file for complete search history.

(56) References Cited

U.S. PATENT DOCUMENTS

| | | | |
|---|---|---|---|
| 7,523,142 B2 * | 4/2009 | Driesen | G06F 17/30286 |
| 7,657,575 B2 | 2/2010 | Eberlein et al. | |
| 7,720,992 B2 | 5/2010 | Brendle et al. | |
| 7,734,648 B2 | 6/2010 | Eberlein | |
| 7,739,387 B2 | 6/2010 | Eberlein et al. | |
| 7,894,602 B2 | 2/2011 | Mueller et al. | |
| 7,962,920 B2 | 6/2011 | Gabriel et al. | |
| 7,971,209 B2 | 6/2011 | Eberlein et al. | |
| 8,126,919 B2 | 2/2012 | Eberlein | |
| 8,200,634 B2 | 6/2012 | Driesen et al. | |
| 8,225,303 B2 | 7/2012 | Wagner et al. | |
| 8,250,135 B2 | 8/2012 | Driesen et al. | |

(Continued)

OTHER PUBLICATIONS

IBM, "IBM InfoSphere Change Data Capture, Version 10.2.1", 2013, Published at https://www.ibm.com/support/knowledgecenter/en/SSTRGZ_10.2.1/com.ibm.cdcdoc.chcclp.doc/refs/listreplicationtables.html.*

(Continued)

*Primary Examiner* — Hossain M Morshed
(74) *Attorney, Agent, or Firm* — Fish & Richardson P.C.

(57) ABSTRACT

Methods, systems, and computer-readable storage media for executing, by a target system deploy tool, a first portion of a target-side maintenance procedure on the target system, halting execution of the first portion of the target-side maintenance procedure, executing, by a source system deploy tool, a source-side maintenance procedure on the source system, wherein, during execution of the source-side maintenance procedure, table structure change events are recorded in a source-side orchestration table, reading, by a replicator, the table structure change events recorded in the source-side orchestration table, writing, by the replicator, the table structure change events to a target-side orchestration table, and executing, by the target system deploy tool, a second portion of the target-side maintenance procedure on the target system, at least in part, by performing the table structure change events of the target-side orchestration table on one or more tables of the target system.

20 Claims, 5 Drawing Sheets

(56) References Cited

U.S. PATENT DOCUMENTS

| | | |
|---|---|---|
| 8,291,038 B2 | 10/2012 | Driesen |
| 8,301,610 B2 | 10/2012 | Driesen et al. |
| 8,356,010 B2 | 1/2013 | Driesen |
| 8,375,130 B2 | 2/2013 | Eberlein et al. |
| 8,380,667 B2 | 2/2013 | Driesen |
| 8,392,573 B2 | 3/2013 | Lehr et al. |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,467,817 B2 | 6/2013 | Said et al. |
| 8,473,942 B2 | 6/2013 | Heidel et al. |
| 8,479,187 B2 * | 7/2013 | Driesen ............... G06F 8/65 717/168 |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,731 B2 | 6/2014 | Engler et al. |
| 8,762,929 B2 | 6/2014 | Driesen |
| 8,769,704 B2 | 7/2014 | Peddada et al. |
| 8,793,230 B2 | 7/2014 | Engelko et al. |
| 8,805,986 B2 | 8/2014 | Driesen et al. |
| 8,812,554 B1 * | 8/2014 | Boulanov ......... G06F 17/30348 707/797 |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,930,413 B2 | 1/2015 | Tang et al. |
| 8,972,934 B2 | 3/2015 | Driesen et al. |
| 8,996,466 B2 * | 3/2015 | Driesen ............ G06F 17/30377 707/640 |
| 9,003,356 B2 | 4/2015 | Driesen et al. |
| 9,009,105 B2 | 4/2015 | Hartig et al. |
| 9,026,502 B2 * | 5/2015 | Driesen ................ G06F 17/303 707/690 |
| 9,026,857 B2 | 5/2015 | Becker et al. |
| 9,031,910 B2 * | 5/2015 | Driesen ............ G06F 17/30356 707/610 |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,251,183 B2 | 2/2016 | Mandelstein et al. |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 6/2016 | Mayer et al. |
| 9,724,757 B2 | 8/2017 | Barrett |
| 2003/0237081 A1 * | 12/2003 | Taylor ............... G06F 8/65 717/168 |
| 2008/0120129 A1 | 5/2008 | Seubert et al. |
| 2008/0301663 A1 * | 12/2008 | Bahat ............... G06F 8/656 717/170 |
| 2010/0153341 A1 | 6/2010 | Driesen et al. |
| 2010/0161648 A1 | 6/2010 | Eberlein et al. |
| 2012/0036166 A1 * | 2/2012 | Qiu ............... G06F 17/30297 707/803 |
| 2013/0132349 A1 | 5/2013 | Hahn et al. |
| 2013/0325672 A1 | 12/2013 | Odenheimer et al. |
| 2013/0332424 A1 | 12/2013 | Nos et al. |
| 2014/0040294 A1 | 2/2014 | An et al. |
| 2014/0047319 A1 | 2/2014 | Eberlein |
| 2014/0101099 A1 | 4/2014 | Driesen et al. |
| 2014/0108440 A1 | 4/2014 | Nos |
| 2014/0164963 A1 | 6/2014 | Klemenz et al. |
| 2014/0325069 A1 | 10/2014 | Odenheimer et al. |
| 2014/0359594 A1 | 12/2014 | Erbe et al. |
| 2014/0379677 A1 | 12/2014 | Driesen et al. |
| 2015/0006608 A1 | 1/2015 | Eberlein et al. |
| 2015/0100546 A1 | 4/2015 | Eberlein et al. |
| 2015/0178332 A1 | 6/2015 | Said et al. |
| 2017/0025441 A1 | 1/2017 | Mori |
| 2017/0371639 A1 * | 12/2017 | Simek ............... G06F 8/65 |

OTHER PUBLICATIONS

U.S. Appl. No. 14/960,983, filed Dec. 7, 2015, Eberlein, et al.
U.S. Appl. No. 15/083,918, filed Mar. 29, 2016, Eberlein, et al.
U.S. Appl. No. 15/087,677, filed Mar. 31, 2016, Eberlein, et al.

\* cited by examiner

UPGRADING SYSTEMS WITH REPLICATED DATA

BACKGROUND

Enterprise systems can include multiple systems that access common data. In some instances, the data is replicated between multiple databases. In other words, data in one database is replicated in another database. Accordingly, an application executing on a first server of a source system can access data in a first database, and an application executing on a second server of a target system can access replicated data in a second database. The application, however, undergoes lifecycle management, which can include maintenance procedures, such as upgrading the application (e.g., from a first version (V1) to a second version (V2)). Such maintenance procedures can result in table structure changes, and/or intermediary states, for example. When deploying a change (e.g., as part of a maintenance procedure) to an application, which interacts with database tables that are replicated to another database system, and consumed by a second application, the setup for replication, the replication execution and the consumption of the replicated data will break, if table structures change. Additionally, intermediary states during deployment are typically inconsistent, thus a concurrent downtime is required on the source system and the target system.

SUMMARY

Implementations of the present disclosure include computer-implemented methods for maintenance procedures in a target system that consumes data replicated from a source system. In some implementations, actions include executing, by a target system deploy tool, a first portion of a target-side maintenance procedure on the target system, halting execution of the first portion of the target-side maintenance procedure, executing, by a source system deploy tool, a source-side maintenance procedure on the source system, wherein, during execution of the source-side maintenance procedure, table structure change events are recorded in a source-side orchestration table, reading, by a replicator, the table structure change events recorded in the source-side orchestration table, writing, by the replicator, the table structure change events to a target-side orchestration table, and executing, by the target system deploy tool, a second portion of the target-side maintenance procedure on the target system, at least in part, by performing the table structure change events of the target-side orchestration table on one or more tables of the target system. Other implementations of this aspect include corresponding systems, apparatus, and computer programs, configured to perform the actions of the methods, encoded on computer storage devices.

These and other implementations can each optionally include one or more of the following features: halting execution of the first portion of the target-side maintenance procedure occurs in response to determining that table structure changes are to be executed in the target system; executing a second portion of the target-side maintenance procedure on the target system occurs in response to completion of the source-side maintenance procedure; the source system and the target system each includes a respective replication table that stores data to be replicated in the target system; the replicator triggers the target system deploy tool to execute the second portion of the target-side maintenance procedure on the target system; the source system comprises an on-premise database system, and the target system comprises a cloud-based database system; and the maintenance procedure comprises an upgrade procedure.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to maintenance procedures in a target system that consumes data replicated from a source system. Implementations can include actions of executing, by a target system deploy tool, a first portion of a target-side maintenance procedure on the target system, halting execution of the first portion of the target-side maintenance procedure, executing, by a source system deploy tool, a source-side maintenance procedure on the source system, wherein, during execution of the source-side maintenance procedure, table structure change events are recorded in a source-side orchestration table, reading, by a replicator, the table structure change events recorded in the source-side orchestration table, writing, by the replicator, the table structure change events to a target-side orchestration table, and executing, by the target system deploy tool, a second portion of the target-side maintenance procedure on the target system, at least in part, by performing the table structure change events of the target-side orchestration table on one or more tables of the target system.

Figure 1:
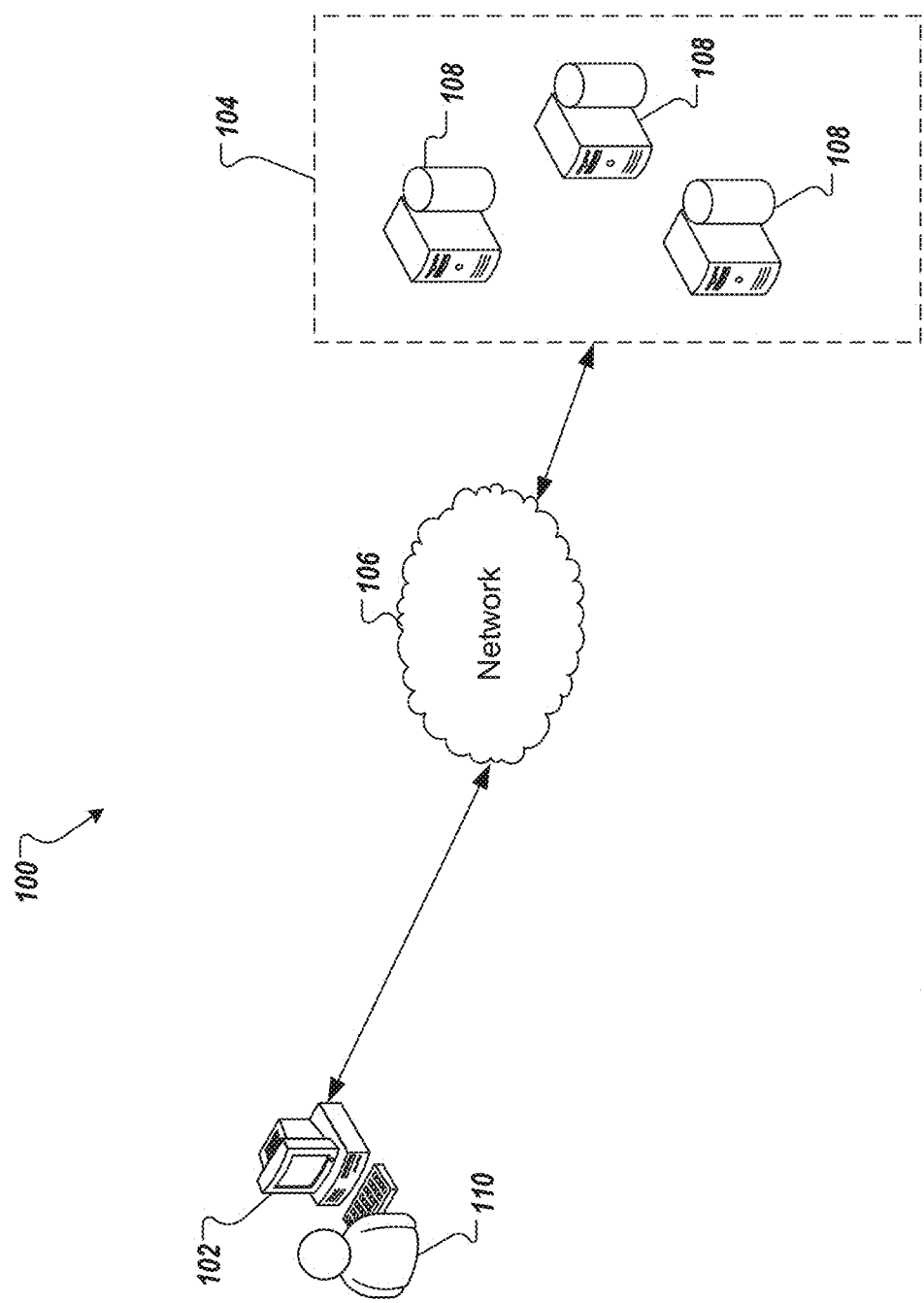
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host an aspect-based sentiment analysis service (e.g., provided as one or more computer-executable programs executed by one or more computing devices). For example, input data can be provided to the server system (e.g., from the client device 102), and the server system can process the input data through the aspect-based sentiment analysis service to provide result data. For example, the server system 104 can send the result data to the client device 102 over the network 106 for display to the user 110.

Implementations of the present disclosure address issues in deploying maintenance procedures in architectures including replicated data. An example architecture includes the S/4HANA Architecture provided by SAP SE of Walldorf, Germany. In general, the S/4HANA Architecture extends a traditional product by implementing additional components running on the so-named HANA Cloup Platform (HCP), which runs in the cloud, and/or the so-named HANA XS Advanced (XSA), which runs on-premise (oP). In some examples, when building components on XSA, users and providers have the option to deploy components side-by-side to a S/4HANA system, or to deploy (or subscribe) to a service running on HCP.

In some examples, the components on XSA or HCP will each interact with tables in the underlying database system, the HANA Platform, such as so-called extension tables. However, the components on XSA or HCP also interact with so-called core tables (e.g., S/4HANA Core Tables (Enterprise Central Component (ECC))). In some examples, master data, and/or transactional data can be accessed, when, for example, database side joins are performed for relatively fast response times. For some scenarios, it does not seem feasible to execute a single record query from a XSA Application to a S/4HANA Core Application, on an ABAP system, and then join in the XSA system. The paradigms used for HANA are "code push down," minimize the result set in HANA, and minimize the data transferred from HANA to the application server. Accordingly, this can require replicating data from the core S/4HANA to the extension (and possibly vice-versa for data from external, big data sources).

As introduced above, implementations of the present disclosure are directed to handling data replication between databases, and lifecycle management procedures (e.g., table structure change, content deployment, product upgrade). In some examples, a source system can refer to a database system that provides data for replication to a target system, which is a database system that stores the replicated data. In general, and as described in further detail herein, to set up the replication, a table is created in a target database, a replication system is installed, and the data transfer is configured. This can be a one-to-one replication (e.g., copying data directly from a source database to the target database), can include data processing (e.g., processing data before copying into the target database). In some examples, replication is performed as batch or in real-time. In batch, the data is transferred from the source table to the target table at a predetermined interval (e.g., once each hour, once a day). In real-time, each change to the source table is replicated to the target table with minimal delay (e.g., delay attributed to processing time, data transfer time). If a source table has a corresponding replication table, the replication process (e.g., either batch, or real-time) can be disrupted by a table structure change.

Implementations of the present disclosure are described in further detail with reference to an upgrade procedure, in which an application is upgraded from a first version (V1) to a second version (V2), the upgrade procedure resulting in a change in table structure, and deployment of content. It is contemplated, however, that implementations of the present disclosure can be realized in any appropriate context (e.g., other maintenance procedures).

In some implementations, an application can be provided for an on-premise system, and a cloud system. In some examples, the application executing in the on-premise system replicates data for access by the application executing in the cloud system (or vice-versa). For example, the application executing in the on-premise system can interact with a database table that is stored in a first database system, and the database table can be replicated to a second database system as a replicated database table. The application executing in the cloud system can interact with the replicated database table that is stored in the second database system. In accordance with the example context, the application can be upgraded from a first version (V1) to a second version (V2). Consequently, the application is upgraded to the second version in the on-premise system, and the application is upgraded to the second version in the cloud system.

Continuing with the above example, when deploying a change to the application (e.g., through the upgrade procedure), the setup for replication, the replication execution, and the consumption of the replicated data will break, if table structures change. Further, intermediary states during deployment of the upgrade procedure are typically inconsistent. Consequently, downtime is required for both the on-premise system, and the cloud system.

As introduced above, a problem exists in that an application upgrade on a source system can require database structure changes (e.g. adding a field, removing a field, changing a field type, changing a key). The change results in different data sets being replicated to a target system. In some instances, this data cannot be processed by the replication machine (if data is processed), and, for example, cannot be inserted into a target table (e.g. a new field is not available on the target table, a field is too short to store the data). One approach to address this is to change the structure of the target table to enable the data within the changed source table structure to be inserted into (replicated to) the target table. However, changing the target table can "break" objects that consume the table (e.g., a table view). If, for example, a target table is altered, and a field is removed, a views selecting the field will be set to "inactive" by the database system, or the alter table will fail, depending on the database.

In some instances, when a view consuming a replicated table is invalidated due to a change in the table structure, the view must also be adjusted. This can be achieved, for example, by deploying an adjusted view structure (e.g., deploying a new version of an application on the target system). This, however, leads to the problem of common deployments of distributed applications, centrally managed with common downtime. Further, if views consume more than one table, the consumed tables need to be altered together to enable the view to be created directly. Otherwise, there is a period of time, when one consumed table is already of the new structure and another is not.

In view of the foregoing, implementations of the present disclosure provide automatic synchronization for an upgrade on a source system, and a target system by entering additional content in an existing replication service. In accordance with implementations of the present disclosure, the deployment (of the upgrade) is prepared on the source system, and the target system, and it is ensured that the versions of the software packages match. A stage-deployment is performed on the target system, which executes with the source structure versions, but has the structure changes prepared, and the new runtime version started in a so-called "dark mode." The deployment of the application upgrade is performed on the source system, including altering of table structures. In some examples, the structure change event is written to an additional database table announcing structure changes to the consumer side using the existing replication service. The replication queue content is processed on the target system, until the content having the old structure is completely processed. An announcement of the structure change is read, and the table structures are altered on the target side. The target version executing in dark mode is switched to active, and continues consuming the replication queue content of the new version.

Figure 2:
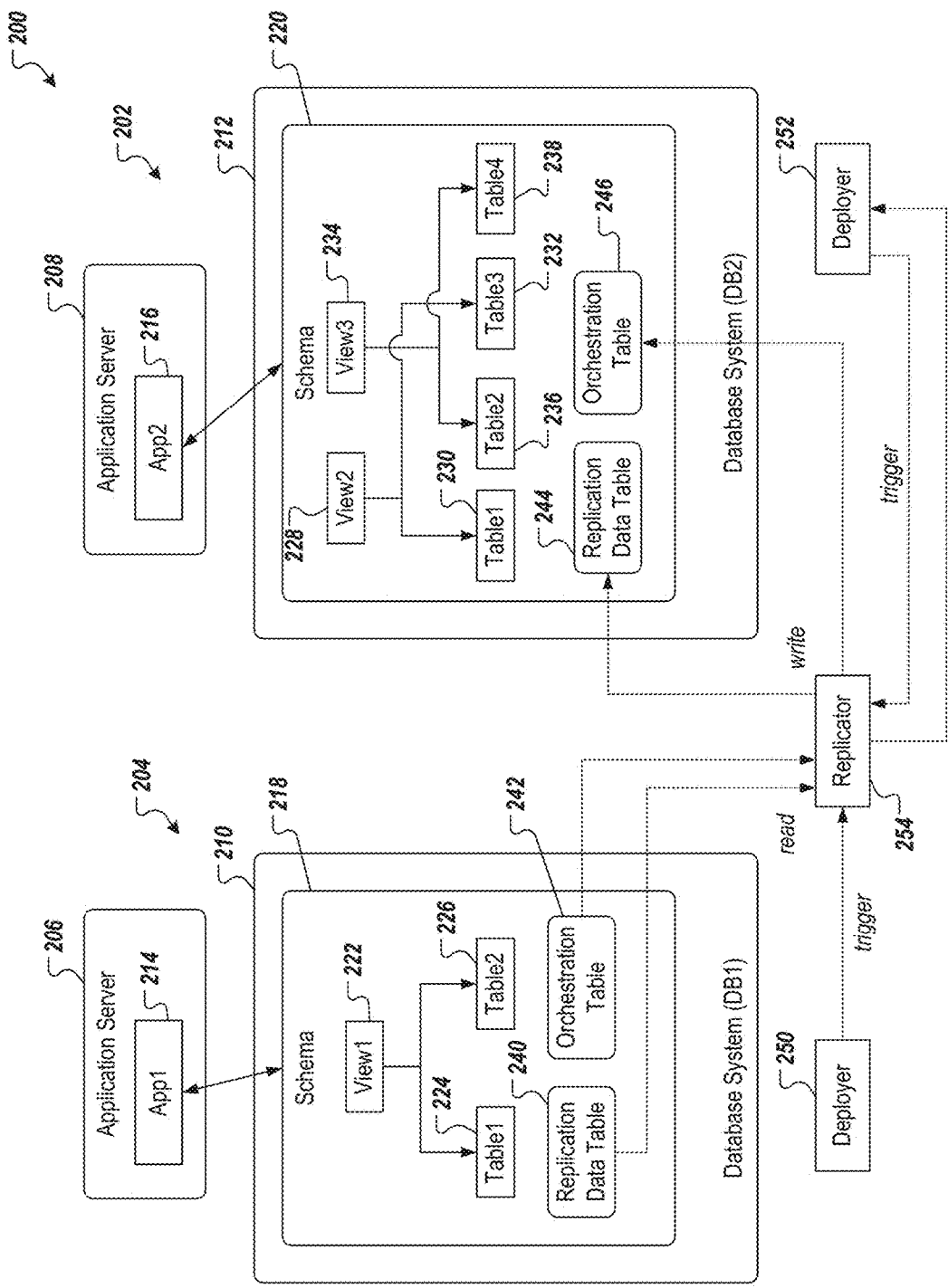
FIG. 2 depicts an example conceptual architecture in accordance with implementations of the present disclosure.
Figure 3:
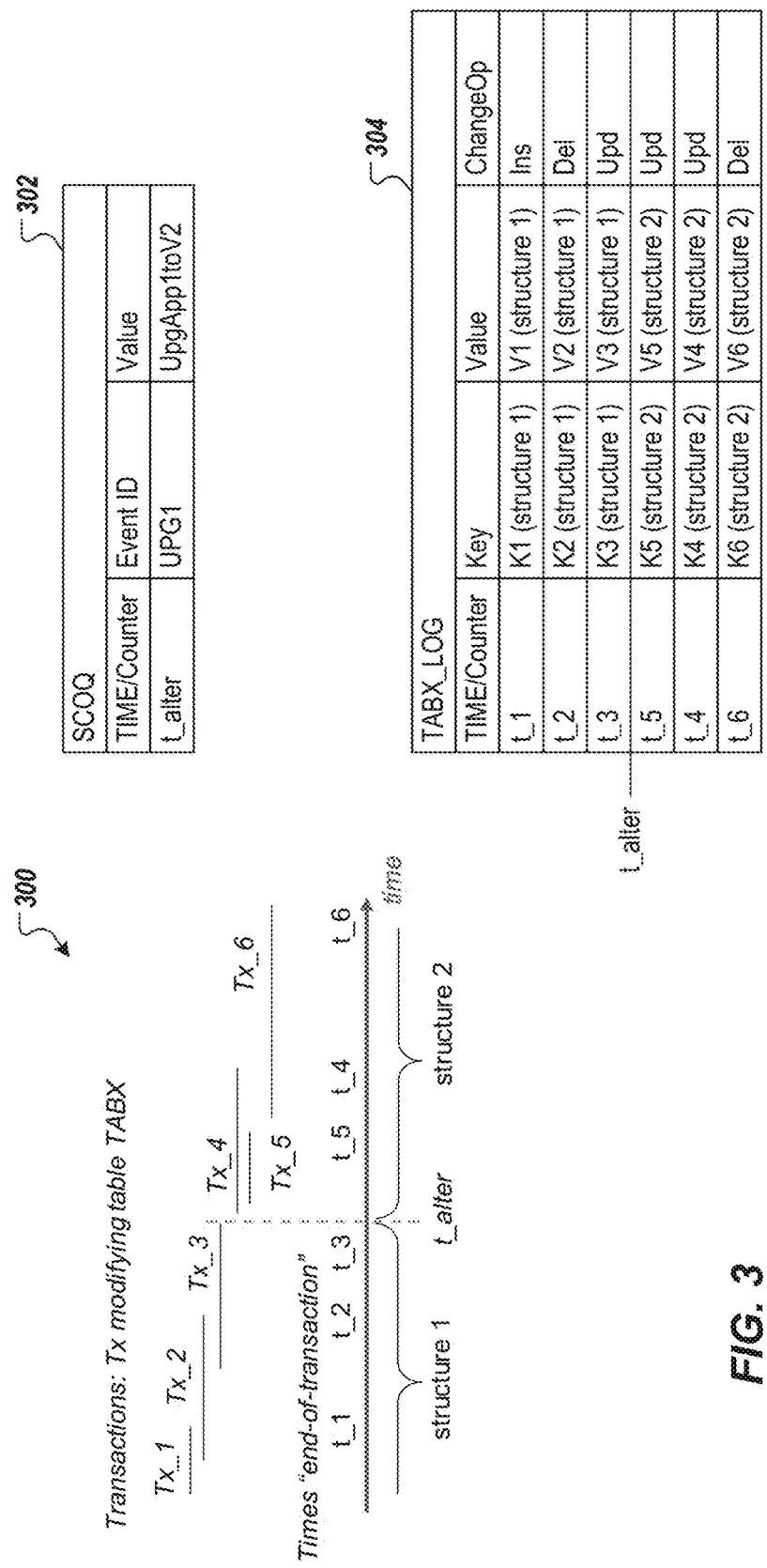
FIG. 3 depicts example transactions and tables in accordance with implementations of the present disclosure.

Implementations of the present disclosure are described in further detail herein with reference to FIGS. 2 and 3. FIG. 2 depicts an example conceptual architecture 200 in accordance with implementations of the present disclosure. The example conceptual architecture 200 includes a source system 202, and a target system 204. For example, and as described in further detail herein, the source system 202 stores data that is replicated to the target system 204.

In the depicted example, the source system 202, and the target system 204 include respective application servers 206, 208, and respective database systems 210, 212. The application servers 206, 208 host respective applications 214, 216, which, at least initially, are of the same version (e.g., V1). The database systems 210, 212 include respective schemas 218, 220, which coordinate how data is provided to the respective applications 214, 216. In the example of FIG. 2, schema 218 includes a view 222 that provides a view to data stored in tables 224, 226, and the schema 220 includes a view 228 that provides a view to data stored in tables 230, 232, and a view 234 that provides a view to data stored in tables 236, 238. In some examples, the tables 230, 236 are respective replications of the tables 224, 226.

In accordance with implementations of the present disclosure, the schema 218 includes a replication data table 240, and an orchestration table 242, and the schema 220 includes a replication data table 244, and an orchestration table 246. In some implementations, the orchestration tables 242, 246 store information about a table, which altered the structure, together with, for example, a timestamp enabling synchronizing the entry with replication entries for other table content replication. The orchestration table 242 is replicated to the target system as the orchestration table 246 (e.g., by a replicator).

A source-side deployer 250, and a target-side deployer 252 are provided, as well as a replicator 254. In some examples, the replicator 254 can be provided on the source-side, can be provided on the target-side, or can be provided in a stand-alone system. In some examples, the deployer 250 deploys the upgrade on the source system 202 (e.g., to upgrade from V1 to V2), and the deployer 252 deploys the upgrade on the target system 204 (e.g., to upgrade from V1 to V2).

In some implementations, and as described in further detail herein, the deployer 250 is aware of the replicator 254, and which tables are being processed by the replicator 254. More particularly, the deployer 250 triggers the replicator 254 to adjust replication mechanisms to a new table structure (e.g., by altering the replication table 244, and by installing a database trigger). In some examples, upon executing structure changes to a table, the replicator 254 writes respective entries to the orchestration table 246. In some implementations, the deployer 252 can stop execution before altering table structures, and wait in this state until triggered to resume operation. In some examples, the deployer 252 can trigger the replicator 254 to resume work, once the structure adjustments are complete.

In general, the replicator 254 reads data from the source system 202, and writes data to the target system 204. The replicator 254 enables synchronizing records of different tables, and/or ordering recorded entries along a time line. The replicator 254 can be notified to execute adjustment to new table structures, can identify entries in the orchestration table 242, and can stop consuming and writing data to the target system 204. The replicator 254 can trigger the deployer 252 to resume deployment, and alter table structures on the target system 204. The replicator can be triggered to resume replication, and continue writing data to the target system 204.

As described in detail herein, implementations of the present disclosure provide deployment procedures that are aware of the structure change orchestration infrastructure. More particularly, implementations of the present disclosure provide an upgrade planning phase, an application staging on the target system phase, an application upgrade on the source system phase, and an application upgrade on the target system phase.

During the upgrade planning phase, a central component (or a local tool on the source system or the target system with the ability to distribute the information to the source system or the target system) defines a valid target configuration for the application on the source system (e.g., App1 214 in the source system 202), and the application on the target system (e.g., App2 216 in the target system 204). The combination App1 V2 and App2 V2 is assumed to be compatible and work. The target configuration "App1 V2" is sent to the deploy tool (e.g., the deployer 250) of the source system to configure the upgrade, and download the application.

A data replication infrastructure (e.g., the replicator 254, which replicates data from the source system to the target system) enables synchronizing consumption of replication data on the target system for different tables (e.g., by transactional replication, or timestamps in the replication data). The deploy procedures prepare an upgrade procedure on the source system, and target system, and ensure that the versions to be deployed are compatible.

The deploy procedure stages the upgrade on the target system by running the upgrade to a step when table structures would be adjusted. The deploy procedure stores the statements to alter the table structures and views consuming the tables for later execution, and prepares the target runtime to be started. A first variant provides a compatible runtime for database structures of V1 and V2 (e.g., the runtime part of the application can work with the old and new database structure of the tables and views). Accordingly, the new runtime can be deployed, and the database content can be upgraded later. In the first variant, the following steps can be prepared: compute table change statements; compute drop/create view statements; upgrade runtime to V2; and start V2 (which can handle the V1 structure).

A second variant (referred to as blue-green deployment) provides that V2 is running, but not used, and V1 is running and is used. More particularly, the runtime can be deployed in blue-green model, in which the blue runtime serves user requests with V1, while the green runtime is dark, running V2. In the second variant, the following steps can be prepared: compute table change statements; compute drop/create view statements; and start runtime V2 as "inactive" waiting for database structure to fit and for requests.

After the upgrade staging on the target system is complete, the upgrade on the source system can be executed. The deploy procedure on the source system defines a downtime for the application being upgraded. During the upgrade of the application App1 to V2, the database table structures are upgraded from V1 to V2. At this point, the structure change notification is written by the deploy tool to the replication queue (e.g., the Structure Change Organization Queue (SCOQ)). If no zero downtime deployment is run, the application is stopped during this step, thus no data is written to the tables, and thus replicated.

Upon change to the structure of a table, the deploy procedure enters an entry into an orchestration table being replicated to the target system. The entry indicates a change in the structure of table. The entry in the orchestration table is synchronized with the structure change of the table ensuring all data recorded for replication before the structure change is identifiable as before the structure event, and all data recorded after the structure change can be identified as after the event. The deploy procedure on the source system triggers the replication infrastructure to adjust the structure of replication tables to enable record and replay of new structure of tables, if required, and adjusting database triggers to new table structure, if required. The upgrade is completed, and application is brought online (e.g., V2), ending downtime on the source system, while the replication system continues to record changes to the tables.

The application of the target system consumes the replicated content. Data will be read from the queues and written to the replication tables. There is also a consumer of the content of the SCOQ. Once the consumer of the content in the SCOQ gets the structure change notification, the completion of the upgrade execution is initiated. The source system running App1 is stopped. At this point, the content of V1 in the queues is consumed. The consumption of additional content is stopped, as it will be of V2. More particularly, the deploy procedure on the target system waits for a trigger to continue the upgrade. The replication infrastructure consumes data replicated, and writes data to the target table until a record is found to alter the structure of a table. The replication infrastructure stops reading replicated data and writing to the tables, when the record is read that the tables change structures. As the replication is synchronous, the data recorded before the structure change is already consumed and written to the table. The following data will have the new structure. The replication infrastructure triggers the deploy procedure on the target system to resume the upgrade and alter the structures. The deploy procedure on the target system defines a downtime for the target application, adjusts table structure and starts the new runtime, then ends the downtime. Once the deploy procedure has completed adjusting the tables and view structures, the replication infrastructure is triggered to resume replication (with the new format).

FIG. 3 depicts example transactions 300 and example tables 302, 304 in accordance with implementations of the present disclosure. In the example of FIG. 3, example transactions 300 are depicted, which modify a table TABX of a source system. The data of the table TABX is replicated to a target system. An application of the source system and the target system are to be upgraded. In accordance with implementations of the present disclosure, the transactions are recorded in a log table 304 indicating operations, and which structure the respective values are recorded under (e.g., structure 1 corresponding to version 1 (V1), structure 2 corresponding to version 2 (V2). In response to the upgrade procedure upgrading the database table structures, an entry is written to the table 302 (the SCOQ) indicating the time that the structures were altered (t alter). In this manner, it can be determined, which operations logged in the log table 304 are performed after t alter to complete upgrade of the target system, as described herein.

Figure 4:
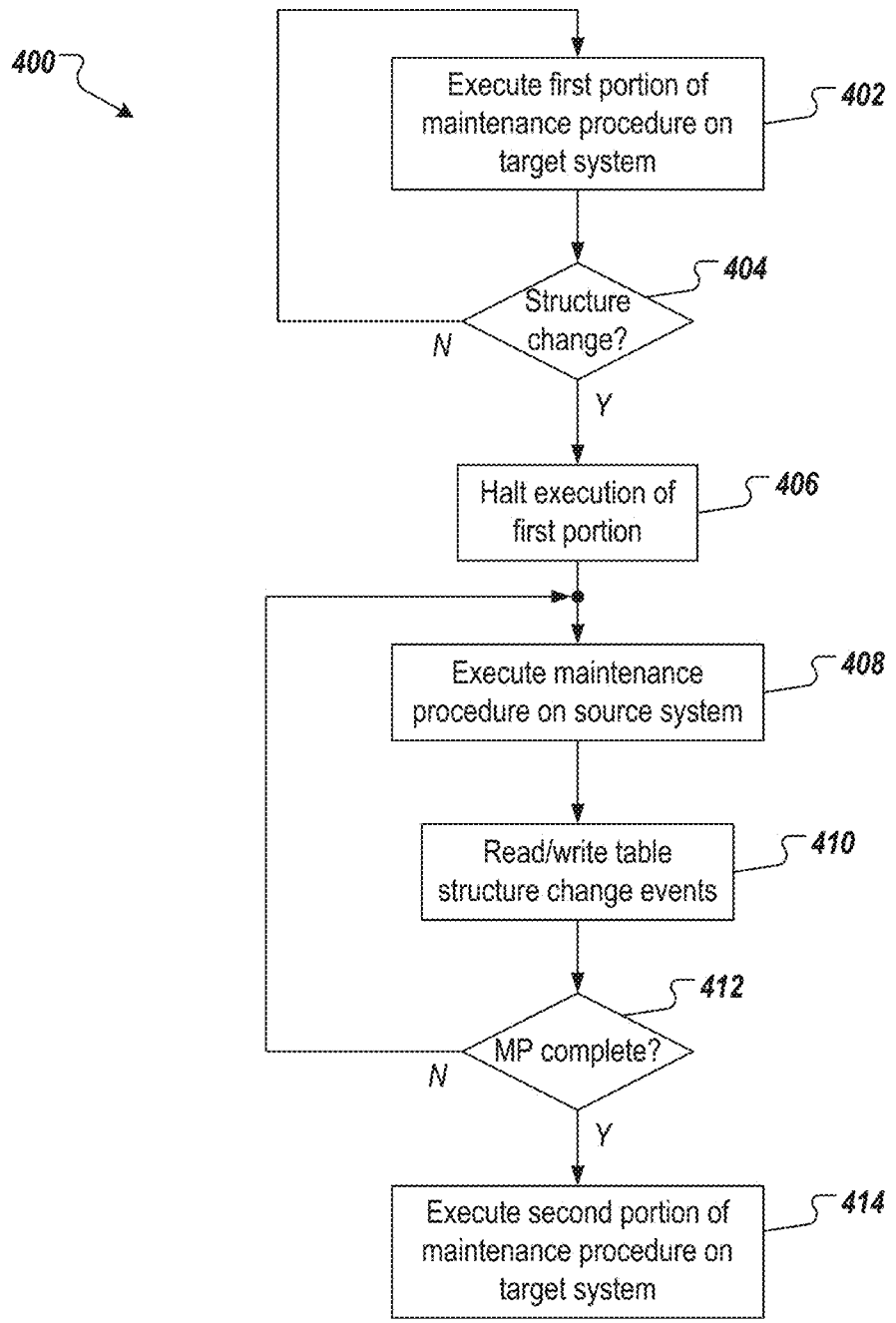
FIG. 4 depicts an example process that can be executed in accordance with implementations of the present disclosure.

FIG. 4 depicts an example process 400 that can be executed in accordance with implementations of the present disclosure. In some examples, the example process 400 can be provided by one or more computer-executable programs executed using one or more computing devices.

A first portion of a target-side maintenance procedure is executed on a target system (402). For example, and with reference to FIG. 2, the deployer 252 executes the first portion on the target system 204 by performing actions that do not alter table structures (e.g., downloading archives, preparing (but not executing) statements to alter tables and dependent views). It is determined whether a structure change operation is to be performed (404). If a structure change operation is not to be performed the first portion is not complete, and the example process 400 loops back to continue execution of the first portion. If a structure change operation is to be performed the first portion is complete, and is halted (406). For example, the deploy tool 252 halts execution of the first portion of the target-side maintenance procedure.

A source-side maintenance procedure is executed on the source system (408). For example, the deployer 250 executes the source-side maintenance procedure on the source system 202. During execution of the source-side maintenance procedure, table structure change events are recorded in a source-side orchestration table, are read from the source-side orchestration table, and are written to a target-side orchestration table (410). For example, the replicator 254 reads the table structure change events from the orchestration table 242, and write the table structure change events to the orchestration table 246.

It is determined whether the source-side maintenance procedure is complete (412). If the source-side maintenance procedure is not complete, the example process 400 loops back to continue execution of the source-side maintenance procedure. If the source-side maintenance procedure is complete, a second portion of the target-side maintenance procedure is executed on the target system (414). For example, the deployer 252 executes the second portion, at least in part, by performing the table structure change events of the target-side orchestration table 246 on one or more tables of the target system.

Implementations of the present disclosure provide one or more of the following example advantages. In some implementations, reliance on a central change management tool to operate on the complete landscape is obviated. In this manner, implementations of the present disclosure can be used in a distributed arrangement with different administrators and operation teams for different systems in the landscape (e.g. cloud, customer IT). Implementations do not rely on a common downtime on the source and target systems. In this manner, implementations of the present disclosure are suited for distributed setup with more than one source and target (e.g. several replications to one cloud service, on-premise systems replicating to several cloud services, cloud-to-cloud replication). Further, implementations minimize system downtime of sender and receiver systems, and do not require changes in the replication technology. In this manner, implementations of the present disclosure can be realized using existing replication technology. Implementations also enable structure change of the tables being replicated, as well as changes in database objects consuming the tables (e.g., views). Implementations do not require modifying data being replicated in the replicator, as they rely on change operations on data being provided by the upgrade procedure—and thus further minimizes the requirements to the replication technology.

Figure 5:
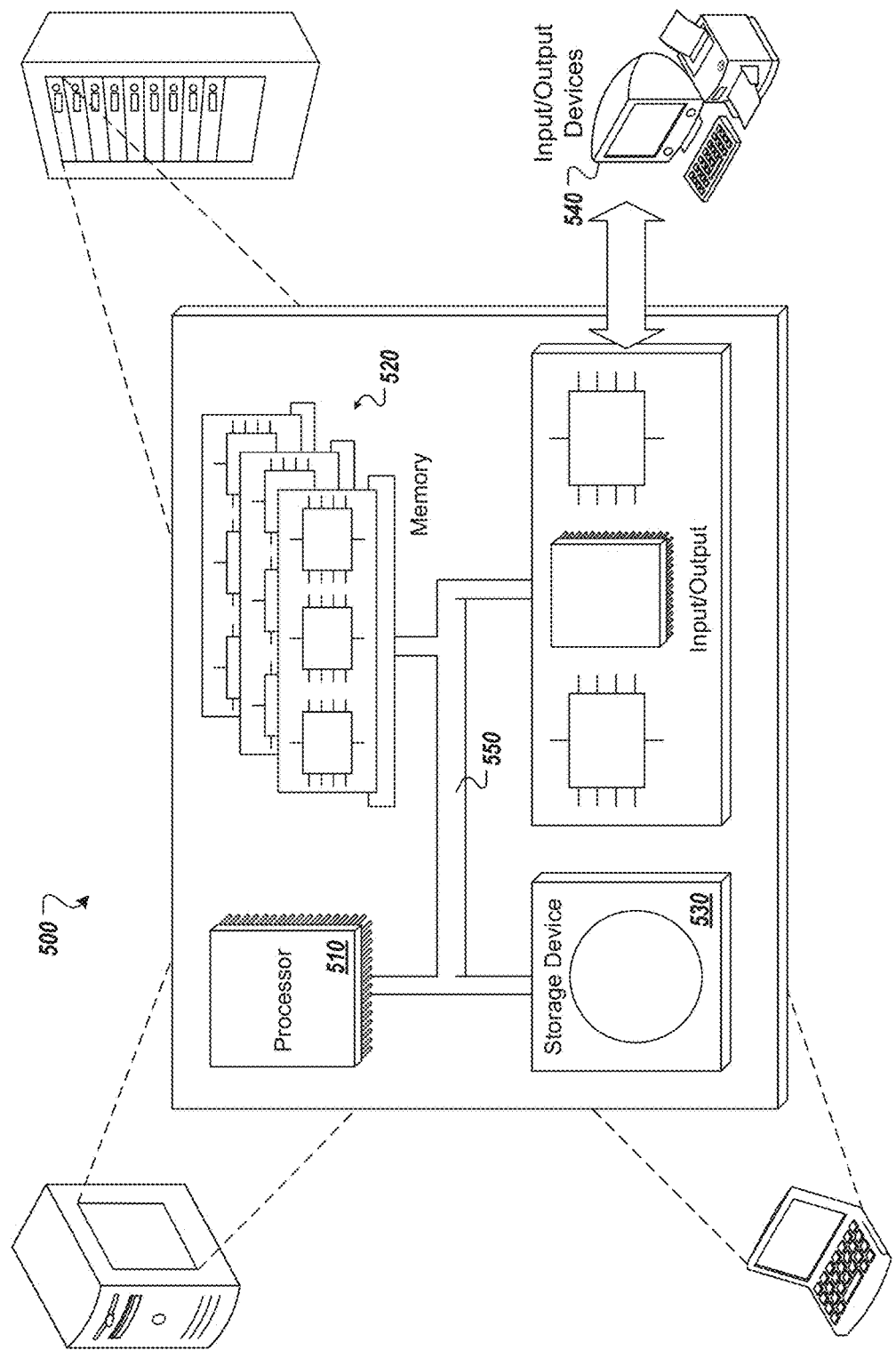
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for maintenance procedures in a target system that consumes data replicated from a source system, the method being executed by one or more processors and comprising:
   defining, during an upgrade phase of an application when the application is upgraded from version one to version two, a valid configuration for the upgraded application on the source system and a valid configuration for the upgraded application on the target system, and ensuring the configurations of the source system and the target system are compatible to each other;
   enabling a replicator for synchronization of table structures of the source system and the target system along a time line by replicating a source system table structure to a target system table structure;
   executing, by a computer-implemented target system deploy tool, a target-side maintenance procedure on the target system when the target system table structure would be adjusted in response to the application on the target system being upgraded from the first version to the second version;
   halting, by the target system deploy tool, execution of the target-side maintenance procedure;
   executing, by a computer-implemented source system deploy tool, a source-side maintenance procedure on the source system in response to the application being upgraded from the first version to the second version on the source system and receiving the defined configuration of the upgraded application on the source system, wherein, during execution of the source-side maintenance procedure, table structure change events of the source system are recorded in a source-side orchestration table;
   reading, by a computer-implemented replicator, the table structure change events recorded in the source-side orchestration table;
   writing, by the replicator, the table structure change events to a target-side orchestration table; and
   resuming, by the target system deploy tool after receiving a trigger from the replicator, the execution of the target-side maintenance procedure on the target system, at least in part, by performing the table structure change events of the target-side orchestration table on one or more tables of the target system, wherein, upon completion of upgrades, the second version of the application on the target system executes in the target system, and the second version of the application on the source system executes in the source system.

2. The method of claim 1, wherein halting execution of the target-side maintenance procedure occurs in response to determining that table structure changes are to be executed in the target system.

3. The method of claim 1, wherein execution of the target-side maintenance procedure on the target system occurs in response to completion of the source-side maintenance procedure.

4. The method of claim 1, wherein the source system and the target system each includes a respective replication table that stores data to be replicated in the target system.

5. The method of claim 1, wherein the replicator triggers the target system deploy tool to execute the target-side maintenance procedure on the target system.

6. The method of claim 1, wherein the source system comprises an on-premise database system, and the target system comprises a cloud-based database system.

7. The method of claim 1, wherein the maintenance procedure comprises an upgrade procedure.

8. A non-transitory computer-readable storage medium coupled to one or more processors and having Instructions stored thereon which, when executed by the one or more processors, cause the one or more processors to perform operations for maintenance procedures in a target system that consumes data replicated from a source system, the operations comprising:
   defining, during an upgrade phase of an application when the application is upgraded from version one to version two, a valid configuration for the upgraded application on the source system and a valid configuration for the upgraded application on the target system, and ensuring the configurations of the source system and the target system are compatible to each other;
   enabling a replicator for synchronization of table structures of the source system and the target system along a time line by replicating a source system table structure to a target system table structure;
   executing, by a computer-implemented target system deploy tool, a target-side maintenance procedure on the target system when the target system table structure would be adjusted in response to the application on the target system being upgraded from the first version to the second version;
   halting, by the target system deploy tool, execution of the first portion of the target-side maintenance procedure;
   executing, by a computer-implemented source system deploy tool, a source-side maintenance procedure on the source system in response to the application being upgraded from the first version to the second version on the source system and receiving the defined configuration of the upgraded application on the source system, wherein, during execution of the source-side maintenance procedure, table structure change events of the source system are recorded in a source-side orchestration table;
   reading, by a computer-Implemented replicator, the table structure change events recorded in the source-side orchestration table;

writing, by the replicator, the table structure change events to a target-side orchestration table; and resuming, by the target system deploy tool after receiving a trigger from the replicator, the execution of the target-side maintenance procedure on the target system, at least in part, by performing the table structure change events of the target-side orchestration table on one or more tables of the target system, wherein, upon completion of upgrades, the second version of the application on the target system executes in the target system, and the second version of the application on the source system executes in the source system.

9. The computer-readable storage medium of claim 8, wherein halting execution of the target-side maintenance procedure occurs in response to determining that table structure changes are to be executed in the target system.

10. The computer-readable storage medium of claim 8, wherein execution of the target-side maintenance procedure on the target system occurs in response to completion of the source-side maintenance procedure.

11. The computer-readable storage medium of claim 8, wherein the source system and the target system each includes a respective replication table that stores data to be replicated in the target system.

12. The computer-readable storage medium of claim 8, wherein the replicator triggers the target system deploy tool to execute the target-side maintenance procedure on the target system.

13. The computer-readable storage medium of claim 8, wherein the source system comprises an on-premise database system, and the target system comprises a cloud-based database system.

14. The computer-readable storage medium of claim 8, wherein the maintenance procedure comprises an upgrade procedure.

15. A system, comprising:
a computing device including a processor; and
a computer-readable storage device coupled to the computing device and having instructions stored thereon which, when executed by the computing device, cause the computing device to perform operations for maintenance procedures in a target system that consumes data replicated from a source system, the operations comprising:
defining, during an upgrade phase of an application when the application is upgraded from version one to version two, a valid configuration for the upgraded application on the source system and a valid configuration for the upgraded application on the target system, and ensuring the configurations of the source system and the target system are compatible to each other;
enabling a replicator for synchronization of table structures of the source system and the target system along a time line by replicating a source system table structure to a target system table structure;
executing, by a computer-implemented target system deploy tool, a target-side maintenance procedure on the target system when the target system table structure would be adjusted in response to the application on the target system being upgraded from the first version to the second version;
halting, by the target system deploy tool, execution of the target-side maintenance procedure;
executing, by a computer-implemented source system deploy tool, a source-side maintenance procedure on the source system in response to the application being upgraded from the first version to the second version on the source system and receiving the defined configuration of the upgraded application on the source system, wherein, during execution of the source-side maintenance procedure, table structure change events of the source system are recorded in a source-side orchestration table;
reading, by a computer-implemented replicator, the table structure change events recorded in the source-side orchestration table;
writing, by the replicator, the table structure change events to a target-side orchestration table; and
resuming, by the target system deploy tool after receiving a trigger from the replicator, the execution of the target-side maintenance procedure on the target system, at least in part, by performing the table structure change events of the target-side orchestration table on one or more tables of the target system, wherein, upon completion of upgrades, the second version of the application on the target system executes in the target system, and the second version of the application on the source system executes in the source system.

16. The system of claim 15, wherein halting execution of the target-side maintenance procedure occurs in response to determining that table structure changes are to be executed in the target system.

17. The system of claim 15, wherein execution of the target-side maintenance procedure on the target system occurs in response to completion of the source-side maintenance procedure.

18. The system of claim 15, wherein the source system and the target system each includes a respective replication table that stores data to be replicated in the target system.

19. The system of claim 15, wherein the replicator triggers the target system deploy tool to execute the target-side maintenance procedure on the target system.

20. The system of claim 15, wherein the source system comprises an on-premise database system, and the target system comprises a cloud-based database system.

* * * * *